United States Patent
Rognin et al.

(10) Patent No.: US 8,929,634 B2
(45) Date of Patent: Jan. 6, 2015

(54) PARAMETRIC IMAGES BASED ON DYNAMIC BEHAVIOR OVER TIME

(75) Inventors: Nicolas Rognin, Manno (CH); Marcel Arditi, Manno (CH); Laurent Mercier, Manno (CH); Peter Frinking, Manno (CH)

(73) Assignee: Bracco Suisse SA, Manno (CH)

( * ) Notice: Subject to any disclaimer, the term of this patent is extended or adjusted under 35 U.S.C. 154(b) by 341 days.

(21) Appl. No.: 13/393,633

(22) PCT Filed: Sep. 1, 2010

(86) PCT No.: PCT/EP2010/062816
§ 371 (c)(1),
(2), (4) Date: May 11, 2012

(87) PCT Pub. No.: WO2011/026866
PCT Pub. Date: Mar. 10, 2011

(65) Prior Publication Data
US 2012/0237098 A1 Sep. 20, 2012

(30) Foreign Application Priority Data

Sep. 1, 2009 (EP) ................................ 09169189
Sep. 18, 2009 (EP) ................................ 09170731

(51) Int. Cl.
*G06K 9/00* (2006.01)
*G06T 7/00* (2006.01)
*A61B 5/00* (2006.01)
*A61B 5/05* (2006.01)

(52) U.S. Cl.
CPC ..... *G06T 7/0016* (2013.01); *G06T 2207/30104* (2013.01); *G06T 2207/10132* (2013.01)
USPC ........................... 382/131; 600/300; 600/411

(58) Field of Classification Search
CPC ............... G06T 1/00; G06T 7/00; G06K 9/00
USPC .......... 382/128–134; 600/407, 410, 425, 427, 600/300, 411; 378/4, 8, 21–27, 901; 128/920, 922
See application file for complete search history.

(56) References Cited

U.S. PATENT DOCUMENTS
8,409,103 B2 * 4/2013 Grunwald et al. ............ 600/468

FOREIGN PATENT DOCUMENTS
CN 101128154 2/2008
CN 101160097 4/2008
(Continued)

OTHER PUBLICATIONS
International Search Report for Application Serial No. PCT/EP2010/062816, European Patent Office, Oct. 13, 2010, pp. 4.
(Continued)

*Primary Examiner* — Abolfazl Tabatabai
(74) *Attorney, Agent, or Firm* — Lane Powell PC; Bryan A. Santarelli (57) ABSTRACT

An embodiment for analyzing a body-part of a patient is proposed. A corresponding data-processing method includes the steps of providing a sequence of input images representing the body-part over an analysis period, each input image including a set of input values each one being indicative of a response to an interrogation signal of a corresponding location of the body-part at a corresponding acquisition instant included in the analysis period, associating an analysis function of time with each one of a set of selected locations, the analysis function modeling a trend of the input values of the selected location in the sequence of input images, and providing a reference function of time for the analysis functions; in an embodiment, the data-processing method further includes comparing the analysis function of each selected location with the reference function to determine a polarity trend representing a trend over the analysis period of a polarity of a divergence between the analysis function of the selected location and the reference function, and creating a parametric image including a parametric value for each selected location, the parametric value being indicative of the polarity trend of the selected location.

19 Claims, 4 Drawing Sheets

(56) References Cited

FOREIGN PATENT DOCUMENTS

| | | |
|---|---|---|
| CN | 101305399 | 11/2008 |
| EP | 0458745 | 11/1991 |
| EP | 0554213 | 8/1993 |
| JP | H0-8336531 | 12/1996 |
| JP | 2005095376 | 4/2005 |
| JP | 2009028194 | 2/2009 |
| JP | 2009100971 | 5/2009 |
| JP | 2010158360 | 7/2010 |
| JP | 2011-507647 | 3/2011 |
| WO | 9115244 | 4/1991 |
| WO | 9409829 | 10/1993 |
| WO | 9516467 | 12/1994 |
| WO | 2004110279 | 12/2004 |
| WO | 2006015971 | 2/2006 |
| WO | 2006090309 | 8/2006 |
| WO | 2006108868 | 10/2006 |
| WO | 2009083557 | 7/2009 |
| WO | 2010142694 | 12/2010 |

OTHER PUBLICATIONS

Nicolas G. Rognin, Peter Frinking, Tristan Messanger and Marcel Arditi, "A New Method for Enhancing Dynamic Vascular Patterns of Focal Liver Lesions in Contrast Ultrasound" Ultrasonics Symposium, 2007. IEEE, IEEE, Piscataway, NJ, USA, Oct. 1, 2007, pp. 546-549, XP031195033.

Rafter et al., Imaging technologies and techniques, Cardiology Clinics 22 (2004), pp. 181-197.

Nicolas G. Rognin, Peter Frinking, Tristan Messager and Marcel Arditi: "A new method for enhancing dynamic vascular patterns of focal liver lesions in contrast ultrasound", IEEE Ultrasonic Symposium, 2007, IEEE Conference Publication; pp. 546-549.

\* cited by examiner

PARAMETRIC IMAGES BASED ON DYNAMIC BEHAVIOR OVER TIME

PRIORITY CLAIM

The present application is a national phase application filed pursuant to 35 USC §371 of International Patent Application Serial No. PCT/EP2010/062816, filed Sep. 1, 2010; which further claims the benefit of European Patent Application 09169189.9 filed Sep. 1, 2009, and European Patent Application 09170731.5 filed Sep. 18, 2009; all of the foregoing applications are incorporated herein by reference in their entireties.

TECHNICAL FIELD

One or more embodiments relate to the diagnostic field. More specifically, one or more embodiments relates to diagnostic applications based on parametric images.

BACKGROUND

Parametric images are commonly used for graphically representing the result of quantitative analysis processes in diagnostic applications. Particularly, this technique may be used for the assessment of blood perfusion in contrast-enhanced ultrasound imaging applications. For this purpose, an ultrasound contrast agent (UCA)—for example, consisting of a suspension of phospholipid-stabilized gas-filled microbubbles—is administered to a patient. The contrast agent acts as an efficient ultrasound reflector, and can be easily detected by applying ultrasound waves and measuring the echo signals that are returned in response thereto. Since the contrast agent flows at the same velocity as red-blood cells in the patient, its detection and tracking provides information about blood perfusion in a body-part under analysis. Particularly, the echo signal that is recorded over time for each location of the body-part is associated with a model function of time; the model function is used to calculate the value of any desired perfusion parameter (for example, a wash-in rate), which characterizes the location of the body-part. A parametric image is then generated by assigning, to each pixel representing a location of the body-part, the corresponding perfusion parameter value. The display of this parametric image shows the spatial distribution of the perfusion parameter values throughout the body-part, especially when the parametric image (being color-coded) is overlaid on a morphological image representing it; this facilitates the identification and characterization of possible locations of the body-part that are abnormally perfused (for example, because of a pathological condition).

However, the parametric images do not reflect a dynamic behavior of each location of the body-part during the analysis process; particularly, they are not capable of representing the kinetics of the corresponding perfusion. Therefore, the parametric images provide quite poor results in specific diagnostic applications (which are mainly based on differences in the perfusion kinetics); a typical example is the characterization of Focal Liver Lesions (FLLs), which exhibit a Dynamic Vascular Pattern (DVP) that substantially differs from the one of healthy parenchyma.

A specific technique based on the use of a parametric image for characterizing lesions in the liver is described in WO-A2-06/090309 (the entire disclosure of which is herein incorporated by reference). In this case, the locations that exhibit an early wash-in, indicative of HepatoCellular Carcinoma (HCC) lesions, are highlighted in the parametric image. These locations are determined by means of a classifier; particularly, in a specific implementation a curve-fitting processor compares a curve defined by the echo signal of each location with characteristic curve data being stored in a dedicated memory structure; if the curve of the location fits a curve characteristic of early wash-in, then the location is classified as an early wash-in location, whereas if the same curve of the location fits a curve characteristic of normal tissue, then the location is classified as normal tissue. The pixels of the early wash-in locations so determined are distinctively denoted in the resulting parametric image (in a specific shade, brightness or color).

However, the above-described technique only determines the early wash-in locations; therefore, for each location, nothing more than binary information, indicating whether the curve of the location fits or not the early wash-in characteristic curve, is available.

Alternatively, WO-A1-2006/108868 (the entire disclosure of which is herein incorporated by reference) describes an animated perfusion technique. In this case, a sequence of computed images is generated, by assigning to each pixel thereof an instantaneous value of its model function (at the corresponding instant). Therefore, the display of the computed images provides an animated representation of the evolution over time of any perfusion parameter of interest; this ensures an enhanced visual perception of the perfusion (due to a resulting temporal smoothing, spatial smoothing, and motion removal). Particularly, in a specific implementation a reference function of time is associated with the echo signals in a reference region of the body-part (for example, deemed to be healthy); each pixel of the computed images is then set to the difference between the instantaneous value of its model function and the instantaneous value of the reference function. This facilitates the detection of any locations that exhibit abnormal perfusion kinetics (as compared to the one of the reference region).

Moreover, "Nicolas G. Rognin et al., A New Method for Enhancing Dynamic Vascular Patterns of Focal Liver Lesions in Contrast Ultrasound, 2007 IEEE Ultrasonics Symposium, Piscataway N.J., USA, LNKD-DOI:10.1109 ULTSYM.2007.142, 1 Oct. 2007, pages 546-549, XP031195033ISBN: 978-1-4244-1383-6" (the entire disclosure of which is herein incorporated by reference) proposes generating, for each location, a processed sequence by subtracting a reference signal from the corresponding echo signal; these processed sequences are then used to produce a sequence of computed images.

However, in the above-described techniques the analysis of the body-part requires the display of the whole sequence of computed images (or at least a significant part thereof). Therefore, the analysis process is quite time consuming; moreover, it is not possible to have an overall overview of the results of the analysis process in an immediate way. In any case, the correct assessment of the perfusion kinetics in the different locations of the body-part remains rather challenging; the obtained results are then strongly dependent on personal skills (with an unavoidable rate of errors).

SUMMARY

In its general terms, one or more embodiments are based on the idea of reflecting the dynamic behavior over time of the analysis process in a single parametric image.

More specifically, an embodiment proposes a data-processing method for analyzing a body-part of a patient. The data-processing method includes the following steps. A sequence of input images, representing the body-part over an analysis period, is provided; each input image includes a set of input values (for example, at the level of pixels or groups of pixels) each one being indicative of a response to an interrogation signal (for example, ultrasound waves) of a corresponding location of the body-part at a corresponding acquisition instant included in the analysis period. An analysis function of time is associated with each one of a set of selected locations (for example, in a Region of Interest or a group of pixels); the analysis function models a trend of the input values of the selected location in the sequence of input images (for example, as determined by means of a fitting process). A reference function of time is provided for the analysis functions (for example, by fitting the input values of a region of the body-part including healthy tissue). In an embodiment, the analysis function of each selected location is compared with the reference function; this operation determines a polarity trend, which represents a trend over the analysis period of a polarity of a divergence between the analysis function of the selected location and the reference function (in other words, it represents how the polarity of the divergence—indicating whether the analysis function is greater or lower than the reference function at each instant—changes in time over the analysis period; for example, if the divergence is determined as a difference between the analysis function and the reference function, the polarity trend may indicate when this difference is null, it is always positive, it is always negative, it changes from positive to negative, or vice-versa, whereas if the divergence is determined as a ratio between the analysis function and the reference function, the polarity trend may indicate when this ratio is one, it is always higher than one, it is always lower than one, it changes from higher to lower than one, or vice-versa). A parametric image is then created; the parametric image includes a parametric value for each selected location, which parametric value is indicative of the polarity trend of the selected location (for example, with a value that represents a class of the polarity trend and/or its measure).

In an embodiment, the polarity trend represents a trend over the analysis period of a sign of a difference between the analysis function of the selected location and the reference function.

In an embodiment, the step of comparing the analysis function of each selected location with the reference function includes calculating a representation of a difference function based on the difference between the analysis function of the selected location and the reference function over the analysis period; the parametric value for each selected location is then calculated according to a trend over the analysis period of a sign of the difference function of the selected location.

In an embodiment, the step of calculating a representation of a difference function includes calculating a discrete representation of the difference function; the discrete representation of the difference function includes a sequence of difference samples each one equal to a difference between a value of the analysis function and a value of the reference function at a corresponding sampling instant.

In an embodiment, the step of calculating a representation of a difference function further includes calculating a parametric representation of the difference function by fitting the sequence of difference samples.

In an embodiment, the step of creating a parametric image includes classifying each selected location into one among a plurality of predefined classes according to the polarity trend of the selected location, and setting the parametric value of each selected location according to the corresponding class.

In an embodiment, the step of classifying each selected location includes classifying the selected location into a positive unipolar class (when the difference function—e.g., its amplitude—is predominantly positive in the analysis period), into a negative unipolar class (when the difference function—e.g., its amplitude—is predominantly negative in the analysis period), into a positive-to-negative bipolar class (when the difference function—e.g., its amplitude—is predominantly positive in a first portion of the analysis period and predominantly negative in a remaining second portion of the analysis period following the first portion), into a negative-to-positive bipolar class (when the difference function—e.g., its amplitude—is predominantly negative in a further first portion of the analysis period and predominantly positive in a remaining further second portion of the analysis period following the further first portion), and/or into a null class (when the difference function is substantially null in the analysis period—e.g., its overall amplitude is below a given threshold).

In an embodiment, the step of classifying the selected location includes calculating a positive energy according to an integration over the analysis period of the difference function where the different function is positive, and calculating a negative energy according to an integration over the analysis period of an absolute value of the difference function where the different function is negative (for example, with the positive energy and the negative energy that are set to the sum of the difference samples or to the integral of the difference function over the analysis period when the difference samples or the difference function are positive or negative, respectively—which positive energy and negative energy are then normalized by dividing each one of them by their sum, so as to obtain a corresponding relative positive energy and relative negative energy); the selected location is then classified into the null class when a sum of the positive energy and the negative energy is lower than a threshold value, into the positive unipolar class when the positive energy (e.g. the relative positive energy) exceeds a further threshold value, into the negative unipolar class when the negative energy (e.g. the relative negative energy) exceeds the further threshold value, and/or into the positive-to-negative bipolar class or the negative-to-positive bipolar class otherwise.

In an embodiment, the step of classifying the selected location into the positive-to-negative bipolar class or the negative-to-positive bipolar class includes calculating a positive peak instant at which the difference function reaches a maximum value in the analysis period, and calculating a negative peak instant at which the difference function reaches a minimum value in the analysis period; the selected location is then classified into the positive-to-negative bipolar class when the maximum peak instant precedes the minimum peak instant, or into the negative-to-positive bipolar class when the minimum peak instant precedes the maximum peak instant.

In an embodiment, the step of creating a parametric image includes calculating an intensity value for each selected location; the intensity value measures the divergence between the analysis function of the selected location and the reference function over the analysis period; the parametric value of each selected location is then set according to the corresponding intensity value.

In an embodiment, the step of calculating an intensity value for each selected location includes setting the intensity value according to an integration over the analysis period of an absolute value of the difference function (for example, equal to the sum of the absolute value of the difference samples or to the integral of the absolute value of the difference function over the analysis period).

In an embodiment, the data-processing method further includes the step of displaying each parametric image; each parametric value of the parametric image is displayed with a graphical representation having a class visualization dimension for the corresponding class and/or an intensity visualization dimension for the corresponding intensity value.

In an embodiment, the class visualization dimension includes a plurality of colors each one for a corresponding class, and the intensity visualization dimension includes a brightness corresponding to the intensity value.

In an embodiment, the step of providing a reference function includes selecting a set of reference locations, and determining the reference function to model a trend of the input values of the reference locations in the sequence of input images.

In an embodiment, the step of determining the reference function includes calculating an average value of the input values of the reference locations in each input image, and determining the reference function to model a trend of the average values in the sequence of input images.

Another embodiment proposes a corresponding computer program; the computer program includes code means for causing a data-processing system (for example, an ultrasound scanner or a distinct computer) to perform the steps of the data-processing method when the computer program is executed on the data-processing system.

A further embodiment proposes a corresponding diagnostic system; the diagnostic system includes means for performing the steps of the data-processing method.

A different embodiment proposes a corresponding computer program product. The computer program product includes a non-transitory computer readable medium embodying a computer program; the computer program includes code means directly loadable into a working memory of a data-processing system thereby configuring the data-processing system to perform the data-processing method.

Another embodiment proposes a diagnostic method for analyzing a body-part of a patient. The diagnostic method includes the following steps. An interrogation signal is applied to the body-part during an analysis period. The method continues by acquiring a sequence of input images representing the body-part over the analysis period; each input image includes a set of input values each one being indicative of a response to the interrogation signal of a corresponding location of the body-part at a corresponding acquisition instant included in the analysis period (with the input images that are processed to associate an analysis function of time with each one of a set of selected locations, the analysis function modeling a trend of the input values of the selected location in the sequence of input images, to compare the analysis function of each selected location with a reference function of time to determine a polarity trend representing a trend over the analysis period of a polarity of a divergence between the analysis function of the selected location and the reference function, and to create a parametric image including a parametric value for each selected location, the parametric value being indicative of the polarity trend of the selected location). A condition of the body-part is then evaluated according to the parametric image.

In an embodiment, the diagnostic method further includes the step of administering a contrast agent to the patient before applying the interrogation signal.

The same additional features described above with reference to the data-processing method apply mutatis mutandis to the computer program, the diagnostic system, the computer program product and the diagnostic method (either alone or in combination with each other).

BRIEF DESCRIPTION OF THE DRAWINGS

One or more embodiments, as well as further features and the advantages thereof, will be best understood with reference to the following detailed description, given purely by way of a non-restrictive indication, to be read in conjunction with the accompanying drawings (wherein corresponding elements are denoted with equal or similar references and their explanation is not repeated for the sake of brevity, and the name of each entity is generally used to denote both its type and its attributes—such as its value, content and representation—for the sake of simplicity). Particularly.

DETAILED DESCRIPTION

Figure 1:
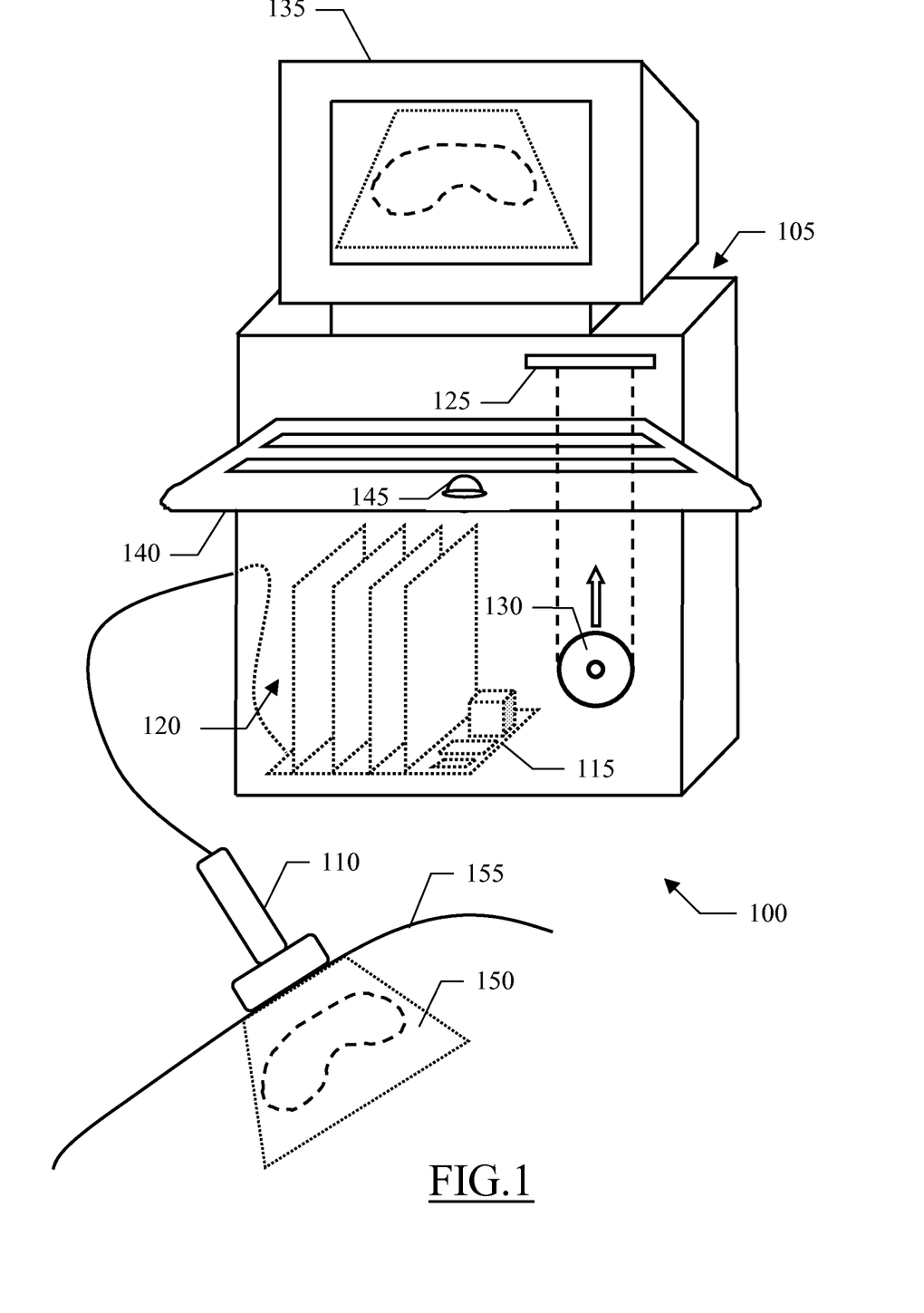
FIG. 1 shows a pictorial representation of an ultrasound scanner that can be used according to an embodiment.

With reference in particular to FIG. 1, there is illustrated an ultrasound scanner 100 that can be used to practice an embodiment. The ultrasound scanner 100 includes a central unit 105 and a hand-held transmit-receive imaging probe 110 (for example, of the array type). The imaging probe 110 transmits ultrasound waves consisting of a sequence of pulses (for example, having a center frequency between 1 and 50 MHz), and receives radio-frequency (RF) echo signals resulting from the reflection of the ultrasound pulses; for this purpose, the imaging probe 110 is provided with a transmit/receive multiplexer, which allows using the imaging probe 110 in the above-described pulse-echo mode.

The central unit 105 houses a motherboard 115, on which there are mounted the electronic circuits controlling operation of the ultrasound scanner 100 (for example, a microprocessor, a working memory and a hard-disk drive). Moreover, one or more daughter boards (denoted as a whole with 120) are plugged into the motherboard 115; the daughter boards 120 provide the electronic circuits for driving the imaging probe 110 and for processing the received echo signals. The ultrasound scanner 100 can also be equipped with a drive 125 for accessing removable disks 120 (such as CDs or DVDs). A monitor 125 displays images relating to an analysis process that is in progress. Operation of the ultrasound scanner 100 is controlled by means of a keyboard 140, which is connected to the central unit 105 in a conventional manner; preferably, the keyboard 140 is provided with a trackball 145 that is used to manipulate the position of a pointer (not shown in the figure) on a screen of the monitor 125.

The ultrasound scanner 100 is used to analyze a body-part 150 of a patient 155, in order to assess a corresponding blood perfusion. For this purpose, during an analysis process of the body-part 150 a contrast agent (acting as an efficient ultrasound reflector) is administered to the patient 155. For example, the contrast agent consists of a suspension of gas bubbles in a liquid carrier; typically, the gas bubbles have diameters on the order of 0.1-5 µm, so as to allow them to pass through the capillaries of the patient 155. The gas bubbles are generally stabilized by entraining or encapsulating the gas or a precursor thereof into a variety of systems, including emulsifiers, oils, thickeners, sugars, proteins or polymers; stabilized gas bubbles are generally referred to as gas-filled microvesicles. The microvesicles include gas bubbles dispersed in an aqueous medium and bound at the gas/liquid interface by a very thin envelope involving a surfactant (i.e., an amphiphilic material), also known as microbubbles. Alternatively, the microvesicles include gas bubbles that are surrounded by a solid material envelope formed of lipids or (natural or synthetic) polymers, also known as microballoons or microcapsules. Another kind of contrast agent includes a suspension of porous microparticles of polymers or other solids, which carry gas bubbles entrapped within the pores of the microparticles. Examples of suitable aqueous suspensions of microvesicles, in particular microbubbles and microballoons, and of the preparation thereof are described in EP-A-0458745, WO-A-91/15244, EP-A-0554213, WO-A-94/09829 and WO-A-95/16467 (the entire disclosures of which are herein incorporated by reference). An example of a commercial contrast agent comprising gas-filled microvesicles is SonoVue® by Bracco International BV.

The contrast agent may be administered to the patient 155 intravenously as a bolus—i.e., a single dose provided by hand with a syringe over a short period of time (of the order of 2-20 seconds). The contrast agent circulates within a vascular system of the patient 155, so as to perfuse the body-part 150. At the same time, the imaging probe 110 is placed in contact with the skin of the patient 155 in the area of the body-part 150. A series of ultrasound pulses with low acoustic energy (such as with a mechanical index MI=0.01-0.1) is applied to the body-part 150, so as to involve a negligible destruction of the contrast agent (such as less than 5%, and, for example, less than 1% of its local concentration between successive ultrasound pulses). An echo signal defined by a sequence of echo values that are recorded for each location of the body-part 150 in a selected scanning plane, in response to the ultrasound pulses at corresponding acquisition instants over time (for example, with a rate of 10-20 acquisitions per second), provides a representation of the location of the body-part in a slice thereof during the analysis process. The echo signal results from the superimposition of different contributions generated by the contrast agent (if present) and the surrounding tissue. The ultrasound scanner 100 may operate in a contrast-specific imaging mode so as to substantially remove, or at least reduce, the dominant (linear) contribution of tissue in the echo signal, with respect to the (non-linear) contribution of the contrast agent; examples of contrast-specific imaging modes include harmonic imaging (HI), pulse inversion (PI), power modulation (PM) and contrast pulse sequencing (CPS) techniques, as described, for example, in "Rafter et al., Imaging technologies and techniques, Cardiology Clinics 22 (2004), pp. 181-197" (the entire disclosure of which is herewith incorporated by reference).

A video image is then generated for each acquisition instant; the video image includes a (digital) value for each visualizing element (i.e., pixel) corresponding to a location of the body-part, which pixel value is defined according to the echo signal that has been recorded for the corresponding location at that acquisition instant. In this way, there is obtained a sequence of video images that represent an evolution of the perfusion of the body-part 150 during the analysis process.

Figure 2:
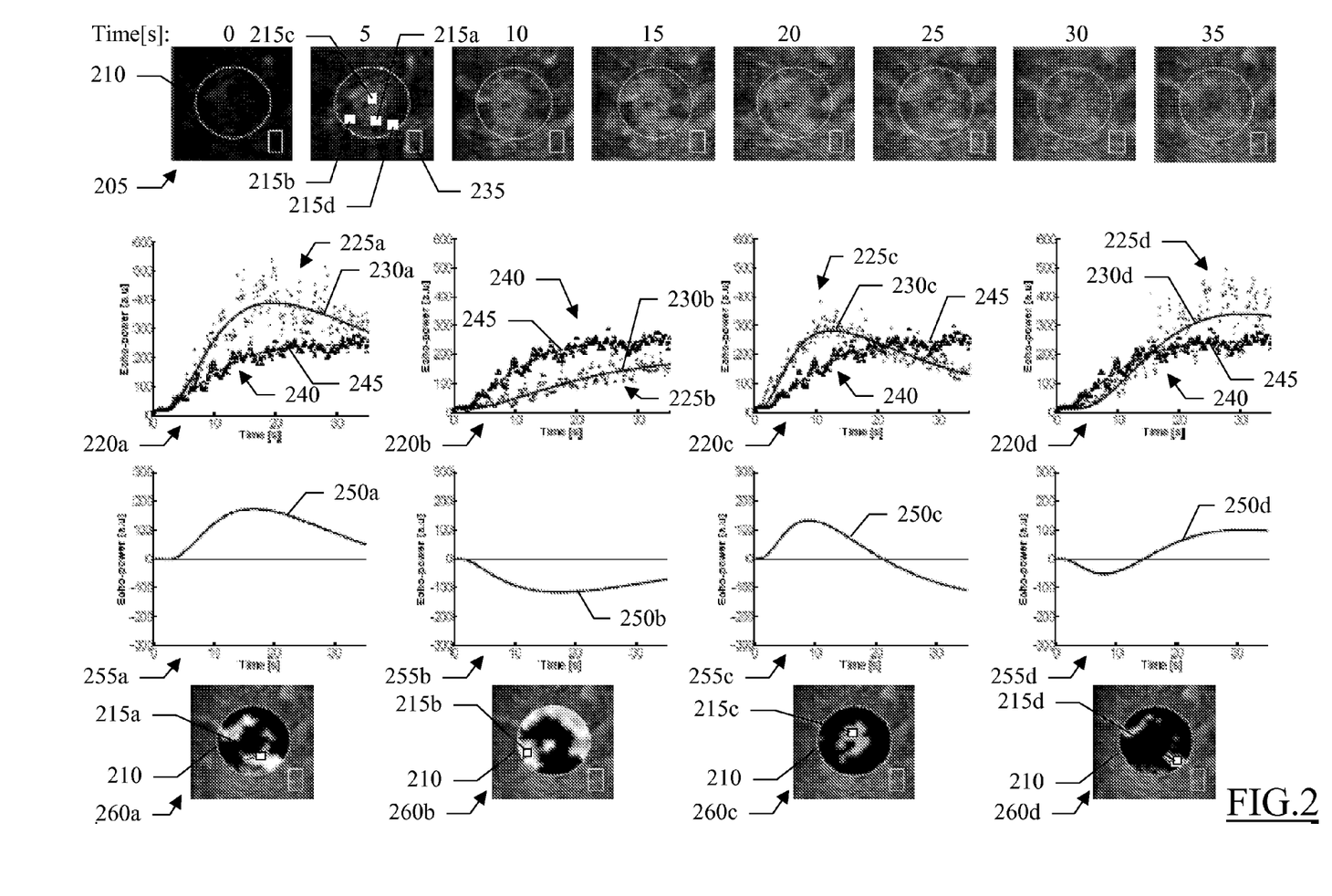
FIG. 2 shows an exemplary application of an embodiment.

An exemplary application of an embodiment is shown in FIG. 2. Particularly, this application relates to the analysis of a liver of a patient with a suspected lesion. For this purpose, the contrast agent has been administered to the patient as a bolus, without any deliberate destruction thereof; a sequence of video images 205 (representing the liver during its perfusion) has been acquired by means of the above-described ultrasound scanner (operating in contrast-specific imaging mode)—although the video images have been acquired with a rate of 15 images per second, only one video image every 5 s is illustrated in the figure for the sake of clarity. An analysis area 210 (for example, drawn by an operator of the ultrasound scanner) defines a region of interest (ROI) of the liver for the analysis process in each one of the video images 205 (for example, outlining tissue deemed to be suspicious or known to be a lesion).

Generally, in a wash-in phase following the administration of the contrast agent the echo signals increase; the echo signals then start decreasing in a wash-out phase of the contrast agent. However, the trend over time (during the analysis process) of the echo signal of each pixel (in the sequence of video images 205) varies according to the characteristics of the corresponding location of the liver. Particularly, the figure details the trend of the echo signal of four specific pixels 215a, 215b, 215c and 215d in corresponding diagrams 220a, 220b, 220c and 220d, respectively; for this purpose, each diagram 220a, 220b 220c and 220d shows a sequence of points 225a, 225b, 225c and 225d, respectively, which represent the power of the corresponding linearized echo signal, or echo-power signal (in terms of arbitrary units, or a.u.) as a function of time (in seconds). Each echo-power signal 225a-225d is then fitted by an instance of a pre-defined model function of time (for example, a lognormal distribution function); the instance of the model function for each pixel 215a, 215b, 215c and 215d (hereinafter referred to as analysis function) is represented (in the diagram 220a, 220b, 220c and 220d, respectively) with a corresponding time-curve 230a, 230b, 230c and 230d (plotting the echo-power signal against the time).

As can be seen, the analysis curve 230a has an initial portion wherein the echo-power signal increases slowly towards a rounded peak at about 20 s (as a result of the wash-in of the contrast agent), and then starts decreasing slowly towards zero (as a result of the wash-out of the contrast agent). The analysis curve 230b instead has an almost linear pattern, wherein the echo-power signal steadily increases over time. Moving now to the analysis curve 230c, the echo-power signal increases quickly towards a rounded peak at about 15 s, and then starts decreasing quickly towards zero. At the end, the echo-power signal of the analysis curve 230d increases very late towards a rounded peak at about 20 s (and then starts decreasing towards zero).

A reference area 235 (for example, again drawn by the operator of the ultrasound scanner) represents a corresponding region of the liver including healthy parenchyma. A trend of the echo-power signal in the reference area 235 is represented in the diagrams 220a-220b with a sequence of points 240—each one representing an average of the (linearized) echo-power signals in the reference area 225 at the corresponding acquisition instant. As above, the echo-power signal 240 is fitted by an instance of the same model function of time, hereinafter referred to as reference function (which is represented in the diagrams 220a-220d with a corresponding time-curve 245).

For each pixel 215a, 215b, 215c and 215d, a difference function is then calculated, by subtracting the reference function 245 from the analysis function 230a, 230b, 230c and 230d, respectively (after any amplitude offset has been removed from the reference function 245 and the analysis functions 230a-230d, by shifting each one of them to obtain an initial value thereof equal to zero). The difference function of the pixels 215a, 215b, 215c and 215d is represented with a corresponding time-curve 250a, 250b, 250c and 250d in another diagram 255a, 255b, 255c and 255d, respectively (again plotting the echo-power signal against the time). As can be seen, the difference function 250a-250b may be positive or negative (and particularly, null) at each acquisition instant; particularly, the difference function 250a-250b is positive when the instantaneous value of the analysis function 230a-230d is higher than the instantaneous value of the reference function 245 (i.e., the analysis curve 230a-230d is above the reference curve 245), whereas the difference function 250a-250b is negative when the instantaneous value of the analysis function 230a-230d is lower than the instantaneous value of the reference function 245 (i.e., the analysis curve 230a-230d is below the reference curve 245)—with the difference function 250a-250b that is null when the instantaneous value of the analysis function 230a-230d is equal to the instantaneous value of the reference function 245 (i.e., the analysis curve 230a-230d coincides with the reference curve 245).

In an embodiment, a parametric value is calculated for each pixel according to a comparison between the corresponding model function and the reference function over the analysis process. A parametric image is then generated, by assigning to each pixel a value that is based on the corresponding parametric value. Particularly, this comparison is based on a polarity trend, which represents a trend over the analysis process of a polarity of a divergence between the model function and the reference function (for example, it represents how a sign of the corresponding difference function changes over time). More specifically, in an embodiment a qualitative indicator and/or a quantitative indicator of this polarity trend are calculated.

For example, the difference function of each pixel is classified by assigning it to one of a discrete set of disjoint categories (classes), according to the values of a set of properties (attributes) thereof; particularly, in a proposed implementation the classification of the difference function is based on its polarity (i.e., positive and/or negative sign over time). For example, the difference function is assigned to a unipolar class when it always has the same polarity (meaning that the corresponding analysis curve is always at the same side of the reference curve), and it is assigned to a bipolar class when it changes its polarity (meaning that the corresponding analysis curve crosses the reference curve). Particularly, the difference function is assigned to a positive unipolar class when it is always positive (meaning that the corresponding analysis curve is always above the reference curve)—as in the case of the difference curve 250a; on the contrary, the difference function is assigned to a negative unipolar class when it is always negative (meaning that the corresponding analysis curve is always below the reference curve)—as in the case of the difference curve 250b. Moreover, the difference function is assigned to a positive-to-negative bipolar class when it changes from positive to negative (meaning that the corresponding analysis curve is above the reference curve at the beginning and then passes below it)—as in the case of the difference curve 250c; on the contrary, the difference function is assigned to a negative-to-positive bipolar class when it changes from negative to positive (meaning that the corresponding analysis curve is below the reference curve at the beginning and then passes above it)—as in the case of the difference curve 250d. In addition, the difference function may also be assigned to a null class (not shown in the figure) when it always has a negligible value—i.e., equal to zero or very low (meaning that the corresponding analysis curve is identical, or quasi-identical, to the reference curve).

In addition or in alternative, for each pixel there is calculated an intensity value that measures a difference between the corresponding analysis function and the reference function over the analysis process (for example, according to an integral of the absolute value of the corresponding difference function); the parametric value of the pixel is then set according to the corresponding intensity value as well.

For example, a single-class parametric image 260a, 260b, 260c and 260d represents each pixel (inside the analysis area 210) having the corresponding difference function that belongs to the positive unipolar class (like the pixel 215a), to the negative unipolar class (like the pixel 215b), to the positive-to-negative bipolar class (like the pixel 215c), and to the negative-to-positive bipolar class (like the pixel 215d), respectively, with a brightness corresponding to the integral of its absolute values (while the other pixels of the analysis area 210 are black). Advantageously, the (single-class) parametric images 260a-260d are combined into a general (multiple-class) parametric image (not shown in the figure), which represents all the pixels inside the analysis area 210. For this purpose, it is possible to assign a different color to each class (for example, red for the positive unipolar class, blue for the negative unipolar class, green for the positive-to-negative bipolar class, yellow for the negative-to-positive bipolar class, and black for the null class). The parametric image then represents each pixel in the color of the class of the corresponding difference function, with a brightness depending on the integral of the absolute value of the corresponding difference function (with the exception of the null class, in which case the brightness has a fixed value).

The above-described embodiment allows accurately reflecting the dynamic behavior of each location of the body-part during the analysis process; particularly, the parametric image so obtained effectively represents the kinetics of the corresponding perfusion. Therefore, the proposed technique may be successfully exploited in specific diagnostic applications (which are mainly based on differences in the perfusion kinetics); for example, the parametric images may be used to characterize Focal Liver Lesions (FLLs), since they exhibit a Dynamic Vascular Pattern (DVP) that substantially differs from the one of healthy parenchyma (as represented by the corresponding difference functions).

With reference in particular to the above-described example, the highlighted pixels in the parametric image 260a for the positive unipolar class (or the pixels in the corresponding red color in the general parametric image) immediately identify the locations of the liver that are affected by hemangioma—i.e., a benign lesion; indeed, these pixels have the corresponding analysis curves that are always above the reference curve (meaning that the corresponding locations exhibit an enhanced perfusion in all the phases of the analysis process with respect to the healthy parenchyma of the reference area 235, as it is typical of the hemangioma). Conversely, the highlighted pixels in the parametric image 260c for the positive-to-negative bipolar class (or the pixels in the corresponding green color in the general parametric image) immediately identify the locations of the liver that are affected by a hyper-vascular metastasis—i.e., a malignant lesion; indeed, these pixels have the corresponding analysis curves that are above the reference curve at the beginning and then pass below it (meaning that the corresponding locations exhibit an early wash-in phase followed by an early wash-out phase with respect to the healthy parenchyma of the reference area 235, as it is typical of hyper-vascular metastases). Moreover, the pixels for the null class (not shown in the figure) may immediately identify the locations of the liver relating to healthy parenchyma.

The analysis process based on the above-described technique is very time effective (since it may rely on a single parametric image). In this case, it is now possible to have an overall overview of the results of the analysis process in an immediate way. All of the above strongly facilitates the correct assessment of the perfusion kinetics in the different locations of the body-part (independently of any personal skills, and with a very low rate of errors).

Figure 3:
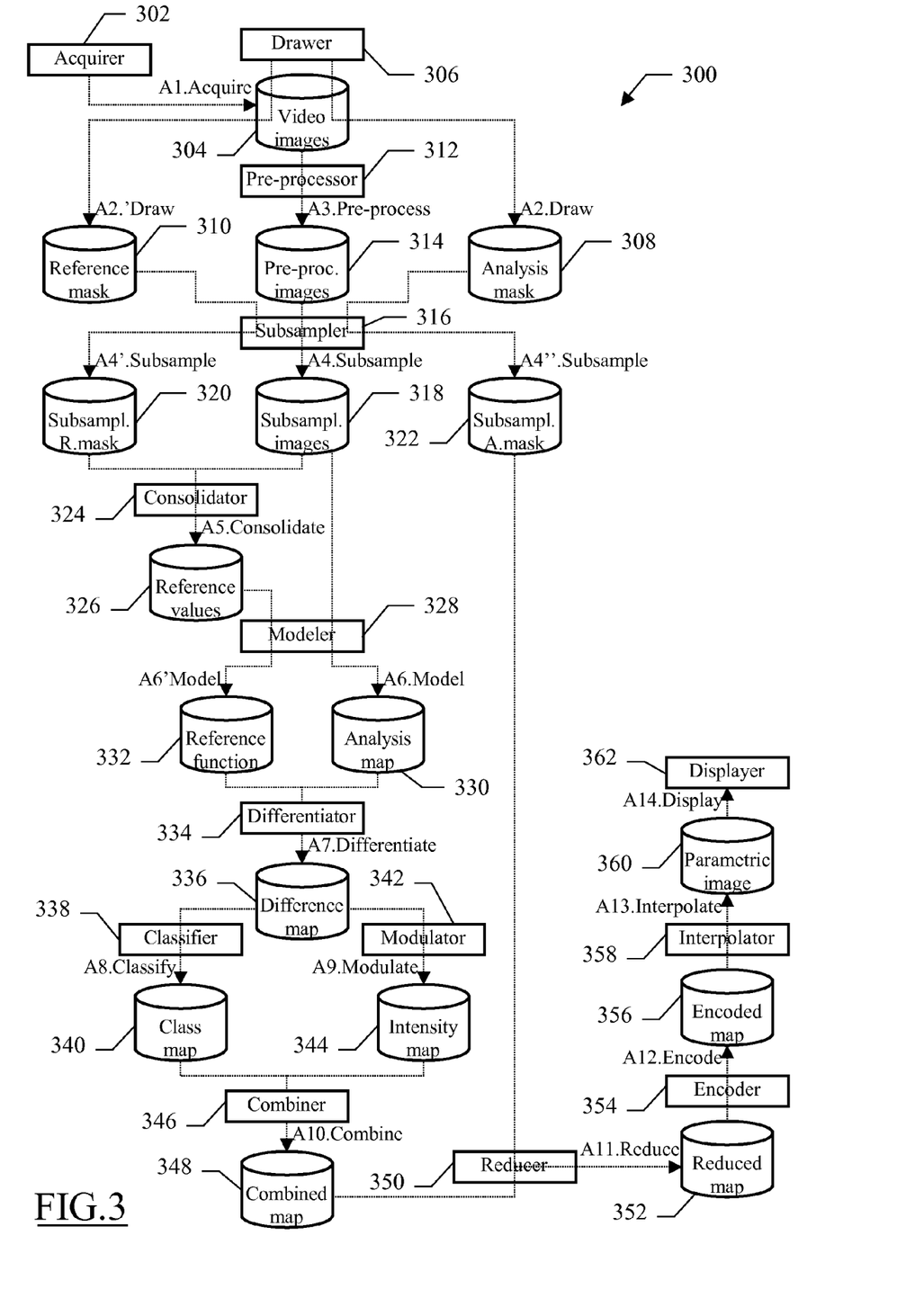
FIG. 3 shows a collaboration diagram representing the roles of the main software and/or hardware components that may be used according to an embodiment.

A collaboration diagram representing the roles of the main software and/or hardware components that may be used to implement an embodiment is illustrated in FIG. 3. These components are denoted as a whole with the reference 300; particularly, the information (programs and data) is typically stored on the hard-disk and loaded (at least partially) into the working memory of the ultrasound scanner when the programs are running, together with an operating system and other application programs (not shown in the figure). The programs are initially installed onto the hard disk, for example, from DVD-ROM. More specifically, the figure describes the static structure of the system (by means of the corresponding components) and its dynamic behavior (by means of a series of exchanged messages, each one representing a corresponding action, denoted with sequence numbers preceded by the symbol "A").

Particularly, an acquirer 302 includes a driver that controls the imaging probe. For example, this driver is provided with a transmit beam former and pulsers for generating the ultrasound pulses to be applied to the body-part under analysis; the imaging probe then receives the analog RF echo signal that is reflected by each location of the body-part in a selected scan plane. These analog RF echo signals are supplied to a receive processor, which pre-amplifies the analog RF echo signals and applies a preliminary time-gain compensation (TGC); the analog RF echo signals are then converted into digital values by an Analog-to-Digital Converter (ADC), and combined into focused beam signals through a receive beam former. The digital echo signals so obtained may be processed through further digital algorithms and other linear or non-linear signal conditioners (for example, a post-beam-forming TGC). Particularly, the receive processor applies a contrast-specific algorithm to suppress the contribution of the tissue (such as based on the above-mentioned HI, PI, PM or CPS techniques). The digital echo signals are then demodulated, log-compressed (in order to obtain images with well-balanced contrast), and scan-converted into a video format. This process generates a sequence of contrast-specific video images (representing the evolution of the perfusion of the body-part during the analysis process), which are saved into a repository 304 for off-line analysis (action "A1.Acquire"). Each video image 304 is defined by a matrix of cells (for example, with 512 rows×512 columns) for the pixels representing the corresponding locations of the body-part. Each cell of the video image 304 stores the pixel value (for example, coded on 8 bits) that defines a brightness of the corresponding pixel; for example, in grayscale video images 304 the pixel value increases from 0 (black) to 255 (white) as a function of the echo-power signal of the corresponding location at its acquisition instant.

A drawer 306 accesses the video images 304. The drawer 306 is used by the operator of the ultrasound scanner to draw, in one arbitrarily-selected video image 304, the analysis area (defining the region of interest of the body-part for the analysis process) and the reference area (defining a region of the body-part with well-defined characteristics). The analysis area is represented with an analysis mask, which is saved into a table 308 (action "A2.Draw"). The analysis mask 308 consists of a matrix of cells with the same size as the input images 304; each cell of the analysis mask 308 stores a binary value, which is assigned the logic value 1 if the corresponding pixel is inside the analysis area, or the logic value 0 otherwise. Likewise, the reference area is represented with a reference mask that is saved into a table 310 (action "A2'.Draw'"). The reference mask 310 consists of a matrix of cells with the same size as the input images 304; each cell of the reference mask 310 stores a binary value, which is assigned the logic value 1 if the corresponding pixel is inside the reference area, or the logic value 0 otherwise.

The video images 304 are supplied to a pre-processor 312. The pre-processor 312 at first removes the video images 304 (if any) that are not suitable for further processing; for example, the pre-processor 312 skips any video image 304 that is misaligned (due to a motion of the patient, to his/her respiratory cycle or to any involuntary movement of the imaging probe) and whose motion cannot be compensated (for example, because of an "out-of-plane" movement). The pre-processor 312 then spatially realigns the (remaining) video images 304 by means of an image registration method (for example, as described in WO-A-2006/015971, the entire disclosure of which is herein incorporated by reference). In addition, the pre-processor 312 linearizes the video images so re-aligned. For this purpose, each pixel value is processed so as to make it directly proportional to the corresponding local concentration of the contrast agent. For example, the result can be achieved by applying an inverse log-compression (to reverse the effect of its application by the acquirer 302), and then squaring the values so obtained (as described in WO-A-2004/110279, the entire disclosures of which is herein incorporated by reference). The above-described operations generate a sequence of pre-processed images, which is saved into a repository 314 (action "A3.Pre-process").

A (spatial) subsampler 316 accesses the pre-processed images 314, the reference mask 310 and the analysis mask 308. The subsampler 316 partitions each pre-processed image 314 into groups of adjacent cells (for example, each one including from 2 to 16 cells along each dimension of the pre-processed image 314) for corresponding groups of pixels defined by a spatial resolution of the imaging probe. For example, the spatial resolution is determined automatically by estimating the smallest significant elements that can be discriminated in the pre-processed images 314 (consisting of the speckle grains that are typically visible therein); this result may be achieved through a spectral analysis of the pre-processed images 314 along each dimension. The subsampler 316 then generates, from each pre-processed image 314, a corresponding subsampled image; the sequence of subsampled images so obtained is then saved into a repository 318 (action "A4.Subsample"). Each subsampled image 318 includes, for each group of cells of the corresponding pre-processed image 314, a single cell that stores a value defined by an average of the corresponding pixel values (for example, being obtained by subsampling the pre-processed image 314 after applying a low-pass filtering). The subsampler 316 also generates a subsampled reference mask from the reference mask 310 (with the same size as the subsampled images 318), which subsampled reference mask is saved into a table 320 (action "A4'.Subsample"); the subsampled reference mask 320 is obtained with a procedure similar to the one described above, being simplified by the fact that each cell value of the subsampled reference mask can only take the logic value 0 or 1. Likewise, the subsampler 316 generates a subsampled analysis mask from the analysis mask 308 (with the same size as the subsampled images 318), which subsampled analysis mask is saved into a table 322 (action "A4".Subsample").

A consolidator 324 accesses the subsampled images 318 and the subsampled reference mask 320. The consolidator 324 calculates a reference value for each subsampled image 318. For this purpose, the consolidator 324 multiplies the subsampled image 318 by the subsampled reference mask 320 cell-by-cell; the reference value is calculated by dividing a sum of the non-zero values thus obtained (i.e., relating to the pixels inside the reference area) by their number. In this way, there is obtained a sequence of reference values (each one representing the reference region at the corresponding acquisition instant), which is saved into an array 326 (action "A5.Consolidate").

The subsampled images 318 and the reference values 326 are then supplied to a modeler 328. The modeler 328 associates each cell of the subsampled images 318 with an instance of the model function (representing the corresponding analysis function). The analysis function is defined by the values of the parameters of the model function; these parameter values are chosen as those that best fit the corresponding sequence of cell values along the subsampled images 318 (using well known error-minimization algorithms). The modeler 328 then generates an analysis map (with the same size as the subsampled images 318), which is saved into a table 330 (action "A6.Model"); each cell of the analysis map 330 stores the parameter values that define the corresponding analysis function. Likewise, the modeler 328 associates the reference values 326 with another instance of the same model function (representing the reference function). The parameter values that define the reference function are stored into a table 332 (action "A6'.Model").

For example, with reference to the above-described application (wherein the contrast agent is administered to the patient as a bolus, without any deliberate destruction thereof), the model function may consist of the lognormal distribution function (i.e., a normal distribution function of the natural logarithm of the independent variable t):

$$B(t) = O + A \cdot \frac{e^{-\frac{[ln(t-t_0)-m_B]^2}{2s_B^2}}}{(t-t_o) \cdot s_B \sqrt{2\pi}} \quad \text{for } t - t_0 > 0, \text{ and}$$

$$B(t) = O \quad \text{for } t - t_0 \leq 0,$$

where $t_0$ represents a delay depending on the choice of a time origin for the analysis process, O is an offset parameter and A is an amplitude parameter (which can be related to the relative regional tissue blood volume); in addition, the parameters $m_B$ and $s_B$ are the mean and standard deviation of the distribution of the natural logarithm of t, respectively. In this case, each instance of the lognormal function (representing a corresponding analysis function or the reference function) is defined by the values of the above-described parameters O, A, $m_B$ and $s_B$.

A differentiator 334 receives the analysis map 330 and the reference function 332. For each cell of the analysis map 340, the differentiator 334 calculates the corresponding difference function (according to the difference between its analysis function from the analysis map 330 and the reference function 332). For this purpose, the differentiator 334 at first evaluates the reference function 332 at sampling instants defined by a sampling period Ts (for example, corresponding to the acquisition rate of the video images 304); this operation generates a sequence of N reference samples (with N equal to the integer of the ratio between the length of the analysis process and the sampling period Ts), said sequence of reference samples being saved into a temporary array. For each cell of the analysis map 330, the differentiator 334 then evaluates the corresponding analysis function at the same sampling instants as the reference function, so as to obtain a sequence of analysis samples that is synchronous with the sequence of reference samples; the differentiator 334 then subtracts each reference sample from the corresponding analysis sample (i.e. at the same sampling instant), so as to obtain a sequence of difference samples that provides a discrete representation of the difference function. This operation generates a difference map (with the same number of cells as the analysis map 330), which is saved into a table 336 (action "A7.Differentiate"); each cell of the difference map 336 stores the corresponding sequence of difference samples (representing the corresponding difference function so calculated).

The difference map 336 is accessed by a classifier 338. The classifier 338 assigns the difference function of each cell of the difference map 336 to the corresponding class (as described in detail in the following); particularly, with reference to the above-described example, the difference function is assigned to one among the positive unipolar class, the negative unipolar class, the positive-to-negative bipolar class, the negative-to-positive bipolar class, and the null class. The classifier 338 then generates a class map (with the same number of cells as the difference map 336), which is saved into a table 340 (action "A8.Classify"); each cell of the class map 340 stores an index that identifies the corresponding class.

The difference map 336 is also accessed by a modulator 342. The modulator 342 calculates the intensity value of each cell of the difference map 336—measuring a difference between the corresponding analysis function and the reference function over the analysis process (as described in detail in the following). The modulator 342 then generates an intensity map (with the same number of cells as the difference map 336), which is saved into a table 344 (action "A9.Modulate"); each cell of the intensity map 344 stores the corresponding intensity value. Advantageously, the intensity map 344 may also be auto-scaled to adjust its dynamic range as described in the International patent application No. PCT/EP2010/058031 of 8 Jun. 2010 (the entire disclosure of which is herein incorporated by reference). Briefly, for this purpose a saturation value is determined for the intensity map 344. The saturation value partitions an ordered sequence of its intensity values into a lower subset and a higher subset consisting of a number of intensity values that is determined according to a predefined auto-scaling percentage (for example, 80-99.99%); particularly, the saturation value is selected so as to have the number of intensity values that are lower than it equal to the auto-scaling percentage (for example, by exploiting a cumulative histogram of the intensity values). Each intensity value is then auto-scaled by leaving it unchanged if the intensity value is included in the lower subset, or by replacing it with the saturation value if the intensity value is included in the higher subset. In this way, the intensity map 344 always contains the same relative number of intensity values (as defined by the auto-scaling percentage) that are saturated at their maximum equal to the saturation value.

A combiner 346 receives the class map 340 and the intensity map 344. The combiner 346 calculates a combined value for each cell of the class map 340 and the intensity map 344. The combined value belongs to a range defined by its class (from the class map 340), with a relative value in this range defined by its intensity value (from the intensity map 344). For example, the combined value ranges from 0-255 for the positive unipolar class, from 256 to 511 for the negative unipolar class, from 512 to 767 for the positive-to-negative bipolar class, and from 768 to 1,022 for the negative-to-positive bipolar class, with the difference between the combined value and the lower limit of its range (i.e., 0, 256, 512 or 768) that is proportional to the corresponding intensity value; the combined value is instead set to a fixed value equal to the lower limit of any one of the above-mentioned ranges, such as 0, for the null class (the fact that the combined value for the null class and the combined value for the corresponding positive unipolar class with the lowest intensity value coincide is not a problem, since the difference functions associated therewith are substantially the same in practice). This operation generates a combined map (with the same size as the class map 340 and the intensity map 344), which is saved into a repository 348 (action "A10.Combine"); each cell of the combined map 348 stores the corresponding combined value.

The combined map 348 and the subsampled analysis map 322 are then passed to a reducer 350. The reducer 350 generates a reduced map by multiplying the combined map 348 by the subsampled analysis map 322 cell-by-cell, which reduced map is saved into a table 352 (action "A11.Reduce"). In this way, the reduced map 352 only includes the combined values of the cells of the combined map 348 that are inside the analysis area (as defined by the subsampled analysis map 322), while the other cell values are reset to 0.

An encoder 354 accesses the reduced map 352. The encoder 354 converts each cell value of the reduced map 352 different from 0 into a discrete value (for example, among 512 levels that are uniformly distributed between the lowest value and the highest value of all the cell values of the reduced map 352, by possibly applying a gain factor). A set of color lookup tables for the above-mentioned classes (not shown in the figure) is then used to associate all the possible levels with the representation of corresponding colors (for example, by means of an index for accessing a location within a corresponding palette containing its actual specification); each color lookup table contains the definition of a single color corresponding to its class (red for the positive unipolar class, blue for the negative unipolar class, green for the positive-to-negative bipolar class, and yellow for the negative-to-positive bipolar class in the example at issue), with different brightness (preferably lighter as the levels increase). More specifically, the range of the cell value (defining its class) selects the corresponding color lookup table and then the color, while the difference between the cell value and the lower limit of the range (defining its intensity value) selects the corresponding entry of this lookup table and then the brightness. The cell values equal to 0 (i.e., for the cells belonging to the null class or outside the analysis area) are instead assigned to a discrete value (such as 0) representing the black color. This operation generates an encoded map (which the same size as the reduced map 352), which is saved into a table 356 (action "A12.Encode"'); each cell of the encoded map 356 stores the corresponding color representation.

The encoded map 356 is passed to a (spatial) interpolator 358. The interpolator 358 expands the encoded map 356 to the size of the video images 304 (512 rows×512 columns in the example at issue). For this purpose, in a so-called nearest neighbor interpolation method, each cell value of the encoded map 356 is replicated for the corresponding group of pixels, and then optionally filtered spatially (for example, by using a low-pass 2D spatial filter). The operation generates a parametric image, which is saved into a corresponding table 360 (action "A13.Interpolate"). A displayer 362 reads the parametric image 360, and controls its display on the monitor of the ultrasound scanner (action "A14.Display").

Figure 4:
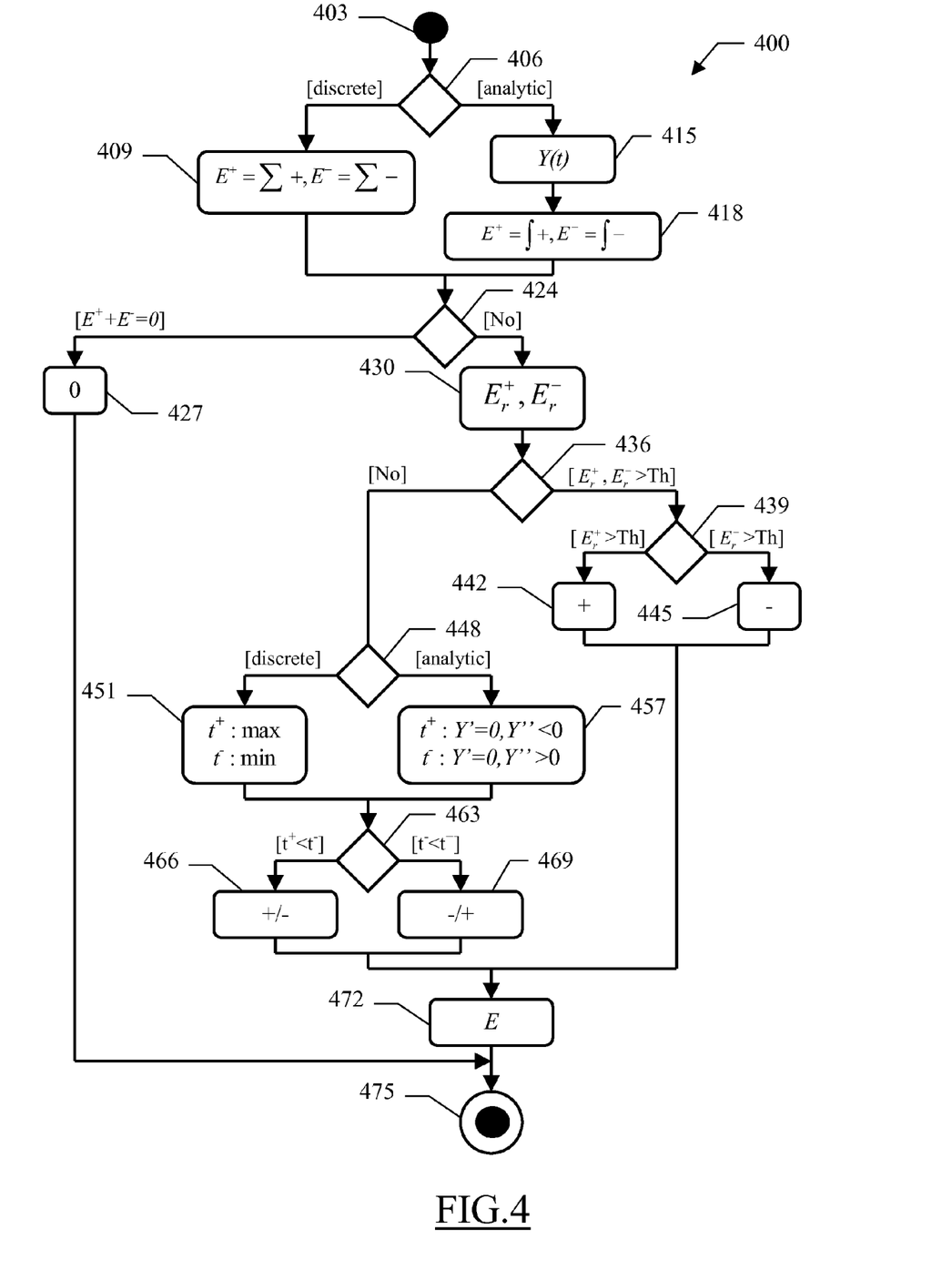
FIG. 4 shows an activity diagram describing the flow of activities relating to an implementation of an embodiment.

An activity diagram describing the flow of activities relating to an implementation of an embodiment is shown in FIG. 4; particularly, the diagram represents an exemplary process that can be implemented in the above-described system for calculating the combined value of each cell of the difference map with a method 400.

The method 400 begins at the black start circle 403, and then passes to classify the difference function (into one among the positive unipolar class, the negative unipolar class, the positive-to-negative bipolar class, the negative-to-positive bipolar class and the null class). In this case, the following decision rules are used to ensure that the difference function is always assigned only to a single one of the available classes. For this purpose, first of all it is determined whether the difference function is predominantly positive or negative. This operation is performed by assessing the positive component and the negative component of the difference function by means of thresholding.

More formally, the flow of activity branches at block 406 according to two alternative implementations. Particularly, when the classification of the difference function is based on its discrete representation (as defined by the corresponding sequence of difference samples) the method descends into block 409; in this phase, a positive energy $E^+$ is calculated as:

$$E^+ = \sum_{n=1}^{N} Y_d(n) \cdot Ts \text{ for } Y_d(n) > 0,$$

wherein $Y_d(n)$ is the $n^{th}$ (n=1 . . . N) difference sample (at the corresponding sampling instant n·Ts); likewise, an (absolute) negative energy $E^-$ of the difference function is calculated as:

$$E^- = -\sum_{n=1}^{N} Y_d(n) \cdot Ts \text{ for } Y_d(n) < 0.$$

Conversely, when the classification of the difference function is performed analytically the method descends from the block 406 into block 415; in this phase, the difference samples are fitted (e.g., with a function of the polynomial type or a combination of lognormal distribution functions) to provide a parametric representation Y(t) of the difference function. Continuing to block 418, the positive energy $E^+$ is now calculated as:

$$E^+ = \int_{t=0}^{T} Y(t) \cdot dt \text{ for } Y(t) > 0,$$

wherein T is the length of the analysis period; likewise, the (absolute) negative energy $E^-$ of the difference function is calculated as:

$$E^+ = -\int_{t=0}^{T} Y(t) \cdot dt \text{ for } Y(t) < 0.$$

The flow of activity then merges at block 424 from the block 409 or the block 418. At this point, a test is made to verify whether both the positive energy $E^+$ and the negative energy $E^-$ are equal to 0 (or whether their sum is lower than a significance threshold—for example, equal to 0.001-0.1 of a maximum allowable pixel value). If so, the difference function is assigned to the null class at block 427, and its intensity value is set to 0.

Conversely (i.e., when at least one of the positive energy $E^+$ and the negative energy $E^-$ is higher than 0, or their sum is higher than the significance threshold), the method 400 descends from the block 424 to block 430. At this point, a (relative) positive energy $E_r^+$ is calculated as:

$$E_r^+ = \frac{E^+}{E^+ + E^-} \quad (\text{with } E_r^+ = 0 \ldots 1);$$

likewise, a (relative) negative energy $E_r^-$ is calculated as:

$$E_r^- = \frac{E^-}{E^+ + E^-} \quad (\text{with } E_r^- = 0 \ldots 1).$$

A test is then made at block 436 to verify whether one of the positive energy $E_r^+$ and the negative energy $E_r^-$ exceeds a given discrimination threshold Th. If so, the method 400 descends into block 439, wherein the flow of activity branches according to which one of the positive energy $E_r^+$ and the negative energy $E_r^-$ satisfies this condition. Particularly, when the positive energy $E_r^+$ exceeds the discrimination threshold Th, the difference function is assigned to the positive unipolar class at block 442; conversely, when the negative energy $E_r^-$ exceeds the discrimination threshold Th, the difference function is assigned to the negative unipolar class at block 445. The discrimination threshold Th may be set to any value higher than 0.5 (for example, Th=0.8-0.9). In this way, the positive unipolar class and the negative unipolar class are mutually exclusive, since the positive energy $E_r^+$ and the negative energy $E_r^-$ cannot both exceed the discrimination threshold Th at the same time (being generally one below 0.5 and the other above 0.5, or at most both of them equal to 0.5).

Referring back to block 436, when neither the positive energy $E_r^+$ nor the negative energy $E_r^-$ reach the discrimination threshold Th, the difference function is assigned to one of the (positive-to-negative or negative-to-positive) bipolar classes. For this purpose, there is determined an order of a main change of polarity in the difference function (disregarding any further change of polarity thereof). This operation is performed by assessing a temporal relation of a positive peak and a negative peak of the difference function.

More formally, in this case the method 400 descends from the block 436 into block 448, wherein the flow of activity again branches according to its two alternative implementations (discrete/analytic). Particularly, when the classification of the difference function is based on its discrete representation the method 400 descends into block 451; in this phase, a positive peak instant $t^+$ is set to the sampling instant of the highest (positive) difference sample; likewise, a negative peak instant $t^-$ is set to the sampling instant of the lowest (negative) difference sample. Conversely, when the classification of the difference function is performed analytically the method 400 descends from the block 448 into block 457; in this phase, the positive peak instant $t^+$ is set to the instant of the absolute maximum of the difference function Y(t) (determined as the highest value among all its local maxima, wherein the first derivative of the difference function Y'(t)=0 and the second derivative of the difference function Y"(t)<0, and its boundary values); likewise, the negative peak instant $t^-$ is set to the instant of the absolute minimum of the difference function Y(t) (determined as the lowest value among all its local minima, wherein the first derivative of the difference function Y'(t)=0 and the second derivative of the difference function Y"(t)>0, and its boundary values).

In both cases, the method 400 now reaches block 463 (from either the block 451 or the block 457). At this point, a comparison is made between the positive peak instant $t^+$ and the negative peak instant $t^-$. When the positive peak instant $t^+$ is lower than the negative peak instant $t^-$ (meaning that the positive peak occurs before the negative peak), the difference function is assigned to the positive-to-negative bipolar class at block 466; conversely, when the negative peak instant $t^-$ is lower than the positive peak instant $t^+$ (meaning that the negative peak occurs before the positive peak), the difference function is assigned to the negative-to-positive bipolar class at block 469. The flow of activity then merges at block 472 from the block 442, the block 445, the block 466 or the block 469. At this point, the intensity value of the difference function is set to its (absolute) total energy E, as defined by:

$$E = E^+ + E^-$$

$$\left(\text{i.e., } E = \sum_{n=1}^{N} |Y_d(n)| \cdot Ts\right.$$

when the classification of the difference function is based on its discrete representation or $$E = \int_{t=0}^{T} |Y(t)| \cdot dt$$

when the classification of the difference function is performed analytically), which total energy E is then normalized to a predefined range (for example, 0-255).

The method 400 then ends at the concentric white/black stop circles 475, either from the block 427 or from the block 472.

Modifications

Naturally, in order to satisfy local and specific requirements, a person skilled in the art may apply to the embodiments described above many logical and/or physical modifications and alterations. More specifically, although embodiments have been described with a certain degree of particularity, it should be understood that various omissions, substitutions and changes in the form and details as well as other embodiments are possible. Particularly, different embodiments may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment may be incorporated in any other embodiment as a matter of general design choice.

For example, an embodiment lends itself to be put into practice with an equivalent data-processing method (by using similar steps, removing some steps being non-essential, or adding further optional steps); moreover, the steps may be performed in a different order, concurrently or in an interleaved way (at least in part).

It should be noted that an embodiment of the proposed data-processing method may be implemented independently of any interaction with the patient (and particularly with the contrast agent that may be pre-administered thereto before performing the data-processing method). Moreover, the contrast agent may also be administered to the patient in a non-invasive manner, or in any case without any substantial physical intervention thereon that would require professional medical expertise or entail any health risk for the patient. In any case, there is not excluded the possibility of applying an embodiment to any other diagnostic systems—for example, based on Magnetic Resonance Imaging (MRI) or X-ray Computed Tomography (CT), even without the administration of any contrast agent. In addition, although an embodiment of the proposed method facilitates the task of a physician, it generally only provides intermediate results that may help him/her in examining the body-part—for example, for diagnostic purposes (even though the diagnosis for curative purposes stricto sensu is always made by the physician himself/ herself).

An embodiment may be applied at the level of single pixels, at the level of groups of pixels, or even at the level of a whole region of interest; moreover, nothing prevents applying an embodiment to 3-D images. In any case, the (input) images to be processed according to an embodiment may be provided with any other technique—for example, without one or more of the above-described pre-processing operations (i.e., the discarding of the unsuitable video images, the realignment of the video images, and their linearization); in addition or in alternative, it is possible to apply further (pre- or post-) processing operations (for example, for discarding the pixels that do not provide an acceptable level of quality of the fitting process). In any case, an embodiment may be applied either to the analysis region only (even selected with different procedures) or to the whole extent of the video images.

Similar considerations apply to other model functions (for example, lagged lognormal, gamma variate, normal, lagged normal, local density random walk, mono-exponential, sigmoid, and so on); more generally, it is possible to use any other function suitable to represent a trend over time of whatever dynamic characteristic of the body-part (for example, based on a maximum or minimum intensity projection of the echo signals). In any case, each instance of the model function may be determined with equivalent techniques—even without making any assumption about its nature (for example, by means of neural networks).

The parametric image may be calculated according to any comparison between the model functions and the reference function; for example, the comparison between the model functions and the reference function may be based on any other arithmetic operation (for example, a ratio—in which case the polarity trend will be equal to, higher than or lower than 1 when the analysis function is equal to, greater than or lower than, respectively, the reference function), and/or it may be performed on other characteristics thereof (for example, their derivatives).

The same operation may also be performed without the actual calculation of any difference function (for example, when the difference samples are not stored in the difference map, but each one of them is used for calculating the corresponding parametric value as soon as it has been obtained, and it is then discarded).

It is also possible to compare the analysis function with the reference function (to determine the polarity trend of their divergence) in an alternative way; for example, this operation may also be performed by simply comparing each analysis sample with the corresponding reference sample (without calculating any difference sample).

Moreover, nothing prevents calculating the difference function analytically directly from the analysis function and the reference function (without calculating the difference samples).

Moreover, additional or alternative criteria may be used for generating the parametric image. For example, in a simplified embodiment the parametric values may be based only on their classes (with the pixels of the parametric image that have all the same brightness in the color of the corresponding class) or only on their intensity values (with the pixels of the parametric image that have all the same color with different brightness).

The classification of the pixels may be performed according to different characteristics of the polarity trend of the difference functions (for example, simply based on the number of changes of polarity irrespectively of their direction), or more generally on any other properties thereof.

The above-described classes are merely illustrative, and they are not to be interpreted in a limitative manner. For example, it is possible to provide any other number of classes (down to a single one)—such as without the null class, with only a unipolar class and a bipolar class, only unipolar classes, only bipolar classes, and so on; moreover, it is possible to provide multiple (positive and negative) bipolar classes (when the polarity changes more times), with the multiple bipolar classes that may also be differentiated according to the number of changes of polarity.

The above-described classification rules are merely illustrative and in no way limitative. For example, the discrimination thresholds for the positive and negative unipolar classes may be set to different values (even different to each other), or they may be determined dynamically on the basis of a statistical analysis of the video images. Similar considerations apply to the significance threshold for the null class.

Likewise, the discrimination between the bipolar classes may be performed in another way (for example, according to the sign of the derivative of the difference function at its first zero-crossing point).

In a similar way, the intensity values may be calculated according to any other measure of the divergence (e.g. the difference) between the model functions and the reference function.

For example, in alternative implementations the intensity values are set to the positive energy for the positive unipolar class, to the negative energy for the negative unipolar class, and to the absolute value of the difference between the positive energy and the negative energy for the bipolar classes.

The obtained parametric image may be displayed in any way (for example, by printing it); moreover, it is also possible to overlay the parametric image on an arbitrarily-selected video image outside the region of interest, or even to combine it with non contrast-specific images (such as fundamental B-mode images being obtained from the echo signals directly). Moreover, even though an embodiment has been described in the foregoing with specific reference to offline analysis, its application in real-time is not excluded—for example, by determining the analysis functions as soon as there is available a sub-set of the video images allowing a significant curve-fitting (based on cubic-spline filtering or median filtering).

Moreover, the different classes and/or intensity values may be represented with corresponding hues, tonalities, or any other visual clues. However, the display of the parametric image in black-and-white or grayscale representation is not excluded.

Nothing prevents providing the reference function in a different way; for example, in another embodiment it is possible to store a database including the definition of predefined reference functions for specific body-parts and/or conditions thereof; these reference functions may be calculated once and for all from sample video images that are acquired from a set of sample patients.

Alternatively, it is possible to select the reference area with different procedures or according to other criteria (even automatically). Furthermore, nothing prevents consolidating the cell values of the reference area with other algorithms (for example, by applying correlation, deconvolution or spectral analyses). Alternatively, the reference function may be determined with equivalent procedures (for example, by first associating an instance of the model function with each group of pixels of the reference area, and then combining these instances of the model function into the desired reference function).

An embodiment may be implemented as a stand-alone module, as a plug-in for a control program of the ultrasound scanner, or even directly in the control program itself; it would be readily apparent that it is also possible to deploy an embodiment as a service that is accessed through a network (such as in the Internet). Similar considerations apply if the program (which may be used to implement each embodiment) is structured in a different way, or if additional modules or functions are provided; likewise, the memory structures may be of other types, or may be replaced with equivalent entities (not necessarily consisting of physical storage media). In any case, the program may take any form suitable to be used by any data-processing system or in connection therewith (for example, within a virtual machine); particularly, the program may be in the form of external or resident software, firmware, or microcode (either in object code or in source code—for example, to be compiled or interpreted). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, an embodiment lends itself to be implemented even with a hardware structure (for example, integrated in a chip of semiconductor material), or with a combination of software and hardware suitably programmed on otherwise configured.

Similar considerations apply if the ultrasound scanner has a different structure or includes equivalent components—either separate to each other or combined together, in whole or in part (for example, with an imaging probe of the linear-, convex-, phased-, or matrix-array type). Alternatively, an embodiment is applied in a diagnostic system that consists of an ultrasound scanner and a distinct computer (or any equivalent data-processing system); in this case, the recorded information is transferred from the ultrasound scanner to the computer for its processing (for example, through a digital, analogue or network connection).

The above-described embodiments, as well as any modification thereof, can advantageously be used in a conventional diagnostic method. Particularly, an embodiment lends itself to be put into practice with equivalent contrast agents; moreover, the contrast agent may be injected in an intra-arterial, intralymphatic, subcutaneous, intramuscular, intradermal, intraperitoneal, interstitial, intrathecal or intratumoral way, as a continuous infusion (with or without the application of destructive flashes), orally (for example, for imaging the gastro-intestinal tract), via a nebulizer into the airways, and the like. Moreover, even though in the preceding description reference has been made to the analysis of the liver, this is not to be intended in a limitative manner—with an embodiment that may likewise find application in any kind of analysis of other body-parts (for example, prostate, heart, and so on). More generally, the term "diagnostic method" is to be interpreted in its broadest meaning (for example, to identify and/or characterize pathological conditions in the region of interest, to monitor the evolution of a pathological condition or the response to a treatment, and the like).

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A data-processing method for analyzing a body-part of a patient, the data-processing method including the steps of:
   providing a sequence of input images representing the body-part over an analysis period, each input image including a set of input values each one being indicative of a response to an interrogation signal of a corresponding location of the body-part at a corresponding acquisition instant included in the analysis period,
   associating an analysis function of time with each one of a set of selected locations, the analysis function modeling a trend of the input values of the selected location in the sequence of input images, and
   providing a reference function of time for the analysis functions,
   comparing the analysis function of each selected location with the reference function to determine a polarity trend representing a trend over the analysis period of a polarity of a divergence between the analysis function of the selected location and the reference function, and
   creating a parametric image including a parametric value for each selected location, the parametric value being indicative of the polarity trend of the selected location.

2. The data-processing method according to claim 1, wherein the polarity trend represents a trend over the analysis period of a sign of a difference between the analysis function of the selected location and the reference function.

3. The data-processing method according to claim 2, wherein the step of comparing the analysis function of each selected location with the reference function includes:
   calculating a representation of a difference function based on the difference between the analysis function of the selected location and the reference function over the analysis period, the parametric value for each selected location being calculated according to a trend over the analysis period of a sign of the difference function of the selected location.

4. The data-processing method according to claim 3, wherein the step of calculating a representation of a difference function includes:
   calculating a discrete representation of the difference function, the discrete representation of the difference function including a sequence of difference samples each one equal to a difference between a value of the analysis function and a value of the reference function at a corresponding sampling instant.

5. The data-processing method according to claim 4, wherein the step of calculating a representation of a difference function further includes:
   calculating a parametric representation of the difference function by fitting the sequence of difference samples.

6. The data-processing method according to claim 3, wherein the step of creating a parametric image includes:
   calculating an intensity value for each selected location, the intensity value measuring the divergence between the analysis function of the selected location and the reference function over the analysis period, and setting the parametric value of each selected location according to the corresponding intensity value.

7. The data-processing method according to claim 6, wherein the step of calculating an intensity value for each selected location includes:
setting the intensity value according to an integration over the analysis period of an absolute value of the difference function.

8. The data-processing method according to claim 1, wherein the step of creating a parametric image includes:
classifying each selected location into one among a plurality of predefined classes according to the polarity trend of the selected location, and
setting the parametric value of each selected location according to the corresponding class.

9. The data-processing method according to claim 8, wherein the step of classifying each selected location includes:
classifying the selected location into a positive unipolar class, when the difference function is predominantly positive in the analysis period, into a negative unipolar class, when the difference function is predominantly negative in the analysis period, into a positive-to-negative bipolar class, when the difference function is predominantly positive in a first portion of the analysis period and predominantly negative in a remaining second portion of the analysis period following the first portion, into a negative-to-positive bipolar class, when the difference function is predominantly negative in a further first portion of the analysis period and predominantly positive in a remaining further second portion of the analysis period following the further first portion, and/or into a null class, when the difference function is substantially null in the analysis period.

10. The data-processing method according to claim 9, wherein the step of classifying the selected location includes:
calculating a positive energy according to an integration over the analysis period of the difference function where the different function is positive,
calculating a negative energy according to an integration over the analysis period of an absolute value of the difference function where the different function is negative, and
classifying the selected location into the null class when a sum of the positive energy and the negative energy is lower than a threshold value, into the positive unipolar class when the positive energy exceeds a further threshold value, into the negative unipolar class when the negative energy exceeds the further threshold value, and/or into the positive-to-negative bipolar class or the negative-to-positive bipolar class otherwise.

11. The data-processing method according to claim 10, wherein the step of classifying the selected location into the positive-to-negative bipolar class or the negative-to-positive bipolar class includes:
calculating a positive peak instant at which the difference function reaches a maximum value in the analysis period,
calculating a negative peak instant at which the difference function reaches a minimum value in the analysis period, and
classifying the selected location into the positive-to-negative bipolar class when the maximum peak instant precedes the minimum peak instant, or into the negative-to-positive bipolar class when the minimum peak instant precedes the maximum peak instant.

12. The data-processing method according to claim 8, further including the step of:
displaying the parametric image, each parametric value of the parametric image being displayed with a graphical representation having a class visualization dimension for the corresponding class and/or an intensity visualization dimension for the corresponding intensity value.

13. The data-processing method according to claim 12, wherein the class visualization dimension includes a plurality of colors each one for a corresponding class, and wherein the intensity visualization dimension includes a brightness corresponding to the intensity value.

14. The data-processing method according to claim 1, wherein the step of providing a reference function includes:
selecting a set of reference locations, and
determining the reference function to model a trend of the input values of the reference locations in the sequence of input images.

15. The data-processing method according to claim 14, wherein the step of determining the reference function includes:
calculating an average value of the input values of the reference locations in each input image, and
determining the reference function to model a trend of the average values in the sequence of input images.

16. A diagnostic system including means for performing the steps of the data-processing method according to claim 1.

17. A computer program product including a non-transitory computer readable medium embodying a computer program, the computer program including code means directly loadable into a working memory of a data-processing system thereby configuring the data-processing system to perform a data-processing method for analyzing a body-part of a patient, the data-processing method including the steps of:
providing a sequence of input images representing the body-part over an analysis period, each input image including a set of input values each one being indicative of a response to an interrogation signal of a corresponding location of the body-part at a corresponding acquisition instant included in the analysis period,
associating an analysis function of time with each one of a set of selected locations, the analysis function modeling a trend of the input values of the selected location in the sequence of input images,
providing a reference function of time for the analysis functions,
comparing the analysis function of each selected location with the reference function to determine a polarity trend representing a trend over the analysis period of a polarity of a divergence between the analysis function of the selected location and the reference function, and
creating a parametric image including a parametric value for each selected location, the parametric value being indicative of the polarity trend of the selected location.

18. A diagnostic method for analyzing a body-part of a patient, the diagnostic method including the steps of:
applying an interrogation signal to the body-part during an analysis period,
acquiring a sequence of input images representing the body-part over the analysis period, each input image including a set of input values each one being indicative of a response to the interrogation signal of a corresponding location of the body-part at a corresponding acquisition instant included in the analysis period, the input images being processed to associate an analysis function of time with each one of a set of selected locations, the analysis function modeling a trend of the input values of the selected location in the sequence of input images, to compare the analysis function of each selected location with a reference function of time to determine a polarity trend representing a trend over the analysis period of a polarity of a divergence between the analysis function of the selected location and the reference function, and to create a parametric image including a parametric value for each selected location, the parametric value being indicative of the polarity trend of the selected location, and evaluating a condition of the body-part according to the parametric image.

19. The diagnostic method according to claim 18, further including the step of:

administering a contrast agent to the patient before applying the interrogation signal.

* * * * *